(12) United States Patent
Dosch et al.

(10) Patent No.: US 8,578,771 B2
(45) Date of Patent: Nov. 12, 2013

(54) COMPACT GRADIOMETER WITH ACCELEROMETER BASED ROTATIONAL CONTROL

(75) Inventors: Daniel E. Dosch, Hamburg, NY (US); Thomas R. Metzger, Wheatfield, NY (US); Patrick W. Garten, Niagara Falls, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 291 days.

(21) Appl. No.: 13/041,963

(22) Filed: Mar. 7, 2011

(65) Prior Publication Data
US 2011/0214503 A1    Sep. 8, 2011

Related U.S. Application Data

(60) Provisional application No. 61/311,131, filed on Mar. 5, 2010.

(51) Int. Cl.
*G01V 7/02*    (2006.01)
*G01V 7/16*    (2006.01)

(52) U.S. Cl.
USPC .......................................................... 73/382 G (58) Field of Classification Search
USPC ................... 73/382 R, 382 G; 702/141, 2–5; 701/504–505
See application file for complete search history.

(56) References Cited

U.S. PATENT DOCUMENTS

| | | | |
|---|---|---|---|
| 5,339,684 A * | 8/1994 | Jircitano et al. | 73/178 R |
| 5,357,802 A | 10/1994 | Hofmeyer et al. | |
| 5,402,340 A * | 3/1995 | White et al. | 702/5 |
| 5,734,104 A * | 3/1998 | Panenka | 73/382 G |
| 5,922,951 A * | 7/1999 | O'Keefe et al. | 73/382 G |
| 6,615,660 B1 * | 9/2003 | Feinberg et al. | 73/382 R |
| 6,883,372 B2 * | 4/2005 | van Leeuwen et al. | 73/382 G |
| 7,181,967 B2 * | 2/2007 | Lee | 73/382 G |
| 7,444,867 B2 * | 11/2008 | Brett et al. | 73/382 R |
| 7,559,149 B2 * | 7/2009 | Van Kann | 33/366.25 |
| 8,359,920 B2 * | 1/2013 | Meyer | 73/382 G |
| 2009/0064778 A1 * | 3/2009 | Metzger et al. | 73/382 G |
| 2010/0180680 A1 | 7/2010 | Zaugg | |

* cited by examiner

*Primary Examiner* — Helen Kwok
(74) *Attorney, Agent, or Firm* — Howard IP Law Group, PC (57) ABSTRACT

A rotational stabilization system and method which allows for greater spatial separation of accelerometer sensors while maintaining or reducing an existing external footprint.

19 Claims, 7 Drawing Sheets

COMPACT GRADIOMETER WITH ACCELEROMETER BASED ROTATIONAL CONTROL

CROSS-REFERENCE TO RELATED APPLICATIONS

This application claims the benefit of U.S. Provisional Application No. 61/311,131 filed Mar. 5, 2010, which is incorporated by reference as if fully set forth herein.

FIELD OF THE INVENTION

This application relates to gravity gradiometer instruments.

BACKGROUND

Figure 1:
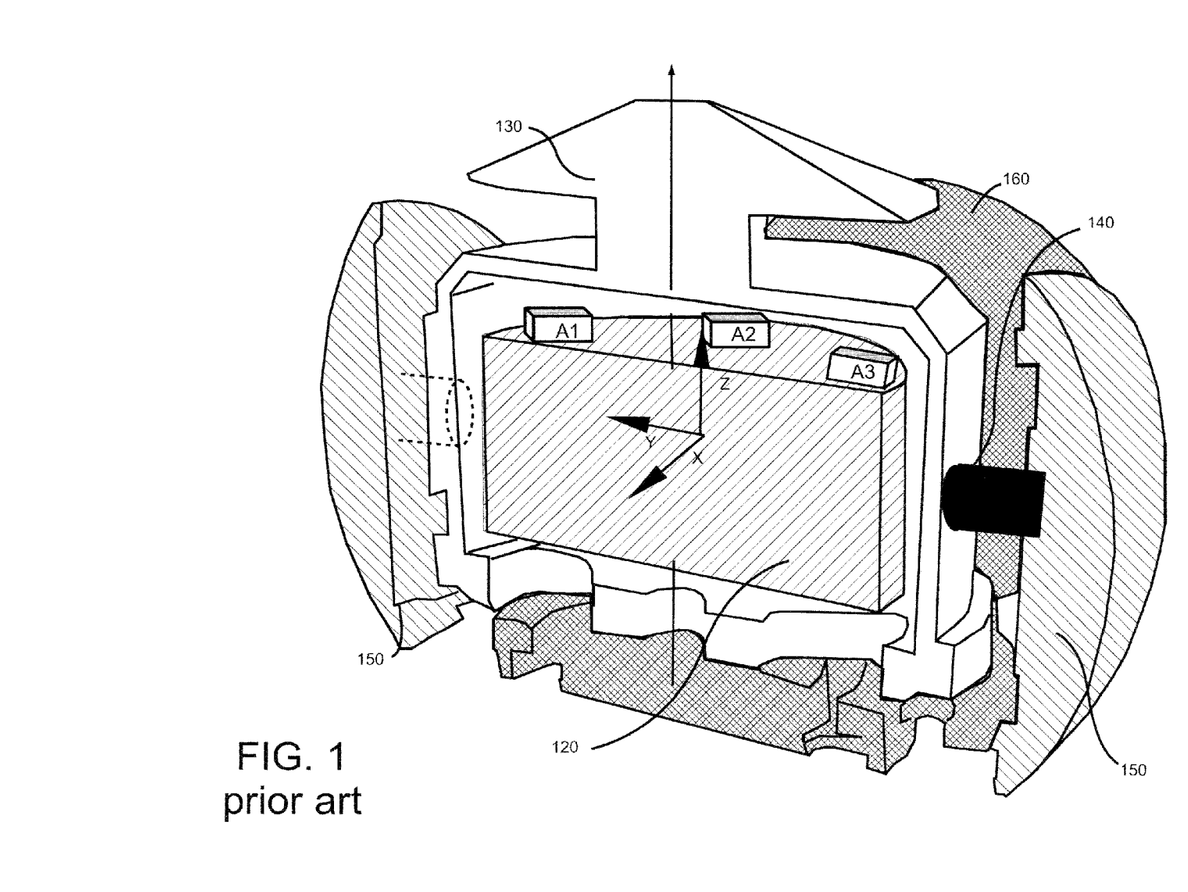
FIG. 1 is a cutaway perspective view of a conventional gravity gradiometer instrument (GGI)

Inertial stabilization in gradiometer systems is typically handled either passively, such as in fixed-base systems with mechanical isolators, or by using mechanical gyroscopes as rotational sensors on a three gimbal stabilized platform separated from the gradient sensors by passive mechanical isolators. Systems designed to be mounted on moving bases have been stabilized using gimbal structures often referred to as "outside-in" structures. FIG. 1 illustrates such a gravity gradiometer instrument (GGI). An outside-in structure is characterized by a system of gimbals which surround the instrument package 120 and define axes of rotation (X,Y,Z) which enable the instrument package 120 to be maintained in a stable position. Each level of gimbal envelops the previous gimbal with the instrument package 120 positioned in an innermost area of the system. The instrument package 120 is housed within an innermost housing 130. The innermost housing 130 is rotatable about a spin axis Z. Innermost housing 130 may be connected to a shaft (not shown) coupled to a servo which provides rotation of the innermost housing 130 along the spin axis Z based on a rotational sensor which provides a signal indicative of a position of the instrument package 120 relative to the spin axis Z. The shaft provides a first degree of rotational freedom and serves as the first level of gimbal. The instrument package 120, includes accelerometers $A_1$, $A_2$, $A_3$, attached thereto, and is located within the inner most housing 130 Innermost housing 130 is located within a first rotational housing 150. The first rotational housing 150 has a bearing 140 mounted on each side of innermost housing 130 providing a second level gimbal which provides rotational motion along input axis Y. The input axis Y is orthogonal to the spin axis Z and provides a second degree of rotation to the instrument package 120. First rotational housing 150 is operatively coupled to a servo which provides rotational movement of the first rotational housing 150 along input axis Y. A second rotational housing 160 surrounds the first rotational housing 150. First 150 and second 160 rotational housings are connected through bearings which are concentric along input axis X and provide rotational movement about input axis X. The second rotational housing 160 is operatively coupled to a servo which provides rotational motion of the second rotational housing about input axis X, which is orthogonal to input axis Y as well as spin axis Z. Bearings (not shown) disposed within the wall of second rotational housing 160 and first rotational housing 150 serve as a third gimbal providing another degree of rotation for instrument package 120. With rotational axes X, Y and Z mutually orthogonal to one another, instrument package 120 is provided with three degrees of rotational freedom, thereby allowing instrument package 120 to remain in a fixed position with respect to that which is outside of the vehicle carrying the GGI.

Such a mobile GGI typically has three degrees of rotational isolation, with the instrument package 120 comprising a plurality of accelerometers A1-A4, being supported by and located within, one or more housings. In such a configuration, the accelerometers A1-A4 are affixed to a structure 120 within the GGI having an outside dimension smaller than that of the surrounding structures providing the further levels of gimbals. Because the accelerometers are housed within the housing having the smallest outside dimensions, the distance between the accelerometers is limited by these dimensions. Smaller distances between accelerometers in a GGI reduces the accuracy of the gravity gradient readings obtained from the GGI.

Non-stationary GGIs are inertially stabilized at least in part due to the inherent problems that arise when attempting to measure gravity gradients in a rotating measurement platform. As gradiometer systems increase in size (e.g. to achieve greater accuracy) larger stabilization systems are required. Practical limitations on the size of systems capable of achieving stabilization levels required for gradiometry and space limitations placed on many applications create an upper bound of available configurations providing the required performance.

The accuracy of a GGI is dependent on the distance separating the various acceleration sensors used to determine the gravity gradients. This accuracy may be compromised by unknown rotations of the gradiometer instrument. Therefore, moving base gradiometer measurements are performed from an inertially stabilized instrument platform. When mechanical gyroscopes (gyros) are used as rotational sensors to stabilize the platform, they need to be vibrationally isolated from the gradiometer instrument. Balanced against this need is the requirement that the rotational rates of the instrument itself need to be controlled and/or determined, rather than that of the platform. If optical gyroscopes are used, quantization effects may lead to performance problems for jitter control that render such devices inadequate for gradiometer applications. Optical gyros with reduced quantization (longer optical paths) may be used, however, the cost of such devices is often too great to implement in gradiometer systems.

Alternative systems and methods are desired.

SUMMARY

According to an aspect of the present invention, a rotational stabilization system is provided which allows for greater spatial separation of accelerometer sensors while maintaining or reducing an existing external footprint. According to an aspect of the invention, a rotational stabilization system is provided which utilizes available rotational accelerometer measurements in an efficient manner. In one embodiment, gradiometer instruments are arranged such that greater separation distances between the accelerometers of a gradiometer system are achieved by locating support and stabilization elements of such a system toward the inside or center of the structure. In one embodiment a coupler having three degrees of rotational freedom is located at a central position relative to an instrument package supporting one or more accelerometers and operatively coupled thereto to provide the support and stabilization elements. This arrangement provides for the center of rotation for the accelerometers to be at the center of the system. In one embodiment one or more gyroscopes are configured to isolate the accelerometers from a stabilized platform while isolating and positioning the accelerometers at greater separation distances, thereby enhancing gradiometer performance.

In one embodiment, a gravity gradiometer system comprises a gravity gradiometer instrument (GGI) comprising at least one accelerometer disposed on an instrument package; and a stabilization coupler having three rotational degrees of freedom, the stabilization coupler arranged centrally relative to the instrument package to provide rotation of the GGI along a spin axis orthogonal to the center of the stabilization coupler. The stabilization coupler has a first rotational axis orthogonal to the spin axis and a second rotational axis orthogonal to the spin axis and the first rotational axis.

In another embodiment, a method of stabilizing a gravity gradiometer system comprising accelerometers configured for providing data indicative of gradient gravitational forces on a test mass comprises receiving via the accelerometers data indicative of components of linear, gravitational, and rotational acceleration; combining the accelerometer data in a manner so as to cancel the linear and gravitational components to generate a signal indicative of rotational motion from the accelerometers; comparing the signal indicative of rotation motion with threshold data; and generating a servo command based on the comparison and indicative of an offset to the rotational acceleration measurement from the accelerometers.

BRIEF DESCRIPTION OF THE DRAWINGS

Understanding of the present invention will be facilitated by consideration of the following detailed description of embodiments of the present invention taken in conjunction with the accompanying drawings, in which like numerals refer to like parts and.

DETAILED DESCRIPTION

The following description of embodiments is merely by way of example and is in no way intended to limit the invention, its applications, or uses.

The accuracy of a gravity gradiometer system is dependent on the distance separating the various acceleration sensors used to determine the gradients. Larger separation distances lead to greater accuracy. Greater accelerometer distances may be achieved by locating support and stabilization elements toward the inside of an instrumentation package.

Figure 2:
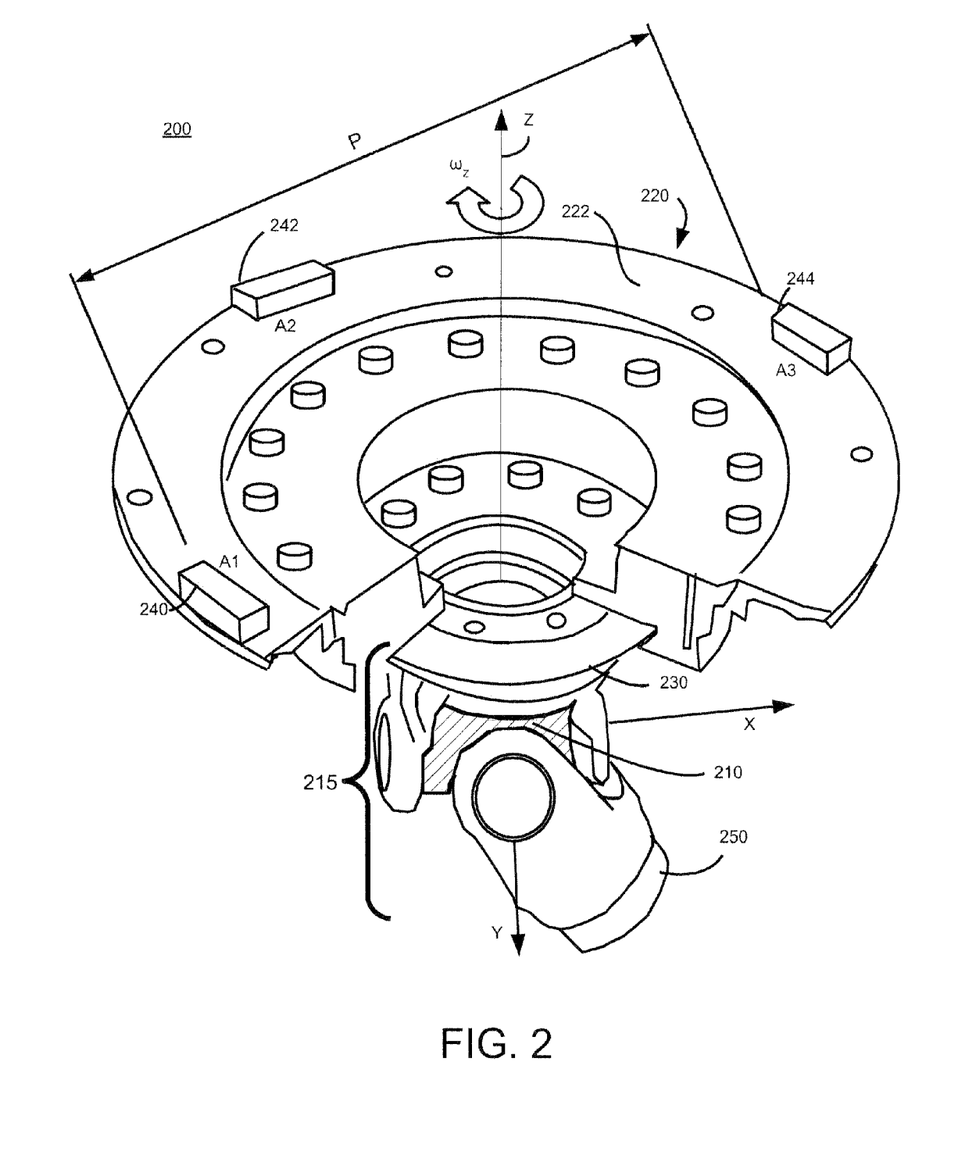
FIG. 2 is a partial cutaway perspective view of a gravity gradiometer housed within a platform according to an embodiment of the present invention.

FIG. 2 illustrates a gravity gradiometer system 200 having a stabilization coupling 215 centrally arranged relative to the stabilized instrument package 220 containing one or more sensitive elements (e.g. accelerometers). The stabilization coupling 215 is located at the center of the gravity gradiometer system 200. In the exemplary embodiment, accelerometer $A_1$ 240 and $A_3$ 244, are each located at a peripheral edge of surface 222 and disposed a distance P apart from one another along the same axis, and in the same plane. Accelerometers $A_2$ 242 and $A_4$ (246, not shown) are located at a distance B (not shown) from one another along a same axis and a same plane, but perpendicular to the axis upon which accelerometers $A_1$ 240 and $A_3$ 244 are located. The accelerometers are located on top surface 222 of instrument package 220. The instrument package 220 is configured as a circular disk with the accelerometers configured to be affixed physically on the top surface 222 of the instrument package 220 and about the perimeter thereof, at substantially the greatest possible distance from each another. It is understood that other configurations may be used in addition to or in place of the embodiment of FIG. 2. For example, a plurality of accelerometers may be positioned in a configuration that is non-coplanar. For example, the instrument package 220 may be configured in a different geometry such as, for example, a polyhedron, (e.g. a tetrahedron) with a plurality of accelerometers disposed at the vertices or, alternatively, along the edges or faces of the polyhedron. The accelerometers may be arranged in a matrix to provide acceleration readings from their respective positions.

As discussed hereinabove, the stabilization coupling 215 provides for three degrees of rotational freedom to the instrument package 220, and may be positioned central to the volume defined by the instrument package 220. Such configuration provides the opportunity for greater accelerometer spacing and hence increased accuracy of gravitational gradient measurements. In one embodiment distances P and B are equal. In an embodiment where P and B are not equal, calculations (e.g. weighting functions) may be modified to account for differences in distance between the accelerometers in each pair.

As shown in FIG. 2, the instrument package 220 is rotationally affixed to a bearing plate 230 which is coupled to the universal joint 210 such that the universal joint provides two degrees of rotational freedom (the X axis and Y axis) for the gravity gradiometer system 200 and the bearing plate 230 provides a third degree of rotational freedom. While the embodiment shown in FIG. 2 depicts a coupling 215 which provides three degrees of rotational freedom, comprising a universal joint 210 and a bearing plate 230, other configurations may be contemplated for providing the GGI with three degrees of rotational stabilization. By way of example, an air bearing or superconducting bearing, which provides three degrees of rotational freedom may be disposed at the center of the gravity gradiometer system 200 to allow stabilization of the GGI from any direction.

Referring again to FIG. 2, the configuration of the bearing plate 230 is interior to and surrounded by the instrument package 220. The bearing plate 230 is rotationally coupled to the instrument package 220, thereby providing a third degree of rotation $\omega_Z$ about a spin axis Z. This configuration provides for three degrees of rotation of the instrument package 220 having accelerometers $A_1$, $A_2$, $A_3$, $A_4$ affixed thereon, with respect to base (260, shown in FIG. 3) upon which the universal joint 210 is mounted. That is, universal joint 210 mounts to base 260 at a mounting point or mounting section 250 at one end, and to the underside of bearing plate 230 at a second end. A system configured in accordance with an embodiment of the present invention may be mounted to any standard vehicle useful for gravity gradiometric survey operations, examples of which include but are not limited to the following: airplanes, dirigibles, ships, and vans. In addition, while FIG. 2 is described in one exemplary orientation, having a base at the bottom with the bearing plate and instrument package above it, the GGI and support structure may be arranged in any orientation. For example, base 260 may be positioned above the GGI system, with the universal joint 210 and bearing plate 230 being suspended from above.

The configuration illustrated in FIG. 2, wherein the instrument package 220 extends beyond the ends of the bearing plate 230 and the accelerometers are affixed to the periphery of the surface of instrument package 220, represents an inside-out gradiometer, in contrast to a typical outside-in configuration. The three gimbal stabilization structure is established at the center (spin axis) of the system with the instrumentation package 220 or platform extending out from the center. This allows the accelerometers, 240, 242, 244, 246 to be spaced at greater distances from one other to provide more accurate gravitational gradient measurements, while maintaining the same or smaller footprint compared to conventional outside-in configurations.

Figure 3:
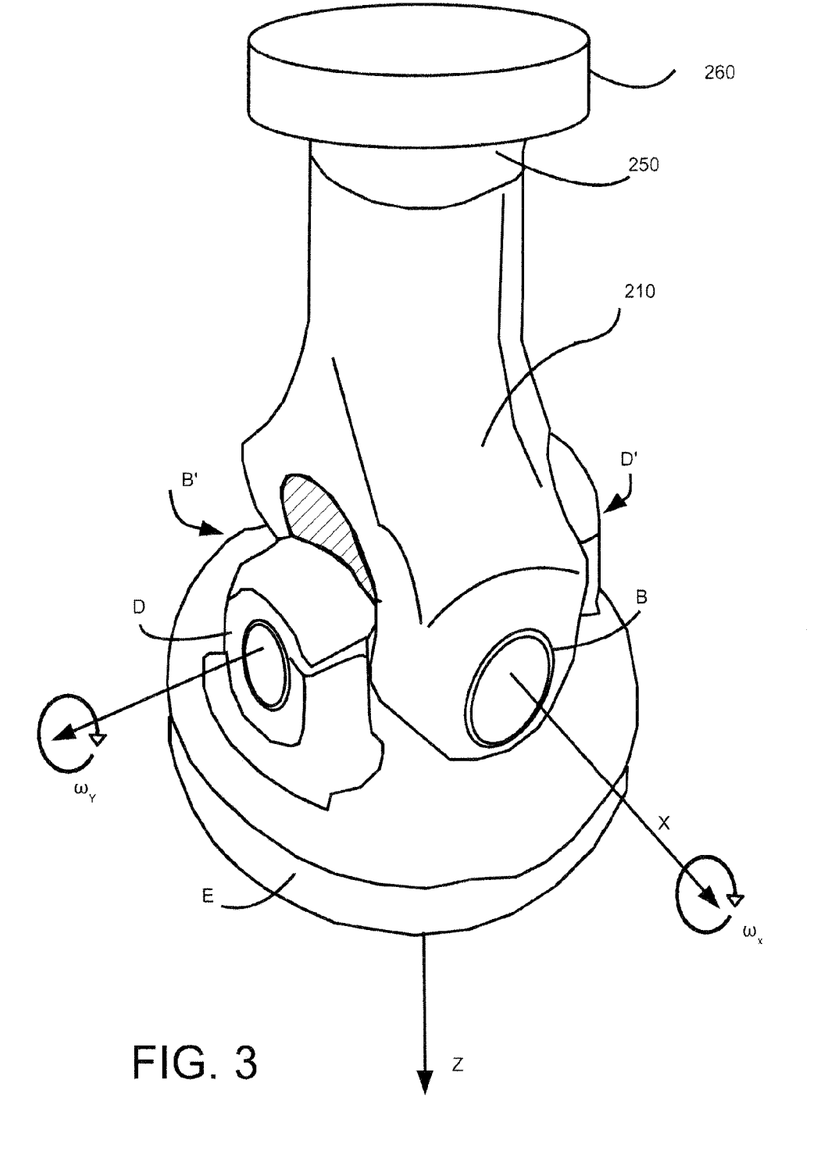
FIG. 3 is an exemplary embodiment of a universal joint for implementation as a component of a coupler having three degrees of rotational freedom and centrally supporting an instrument package according to an embodiment of the present invention.
Figure 4A:
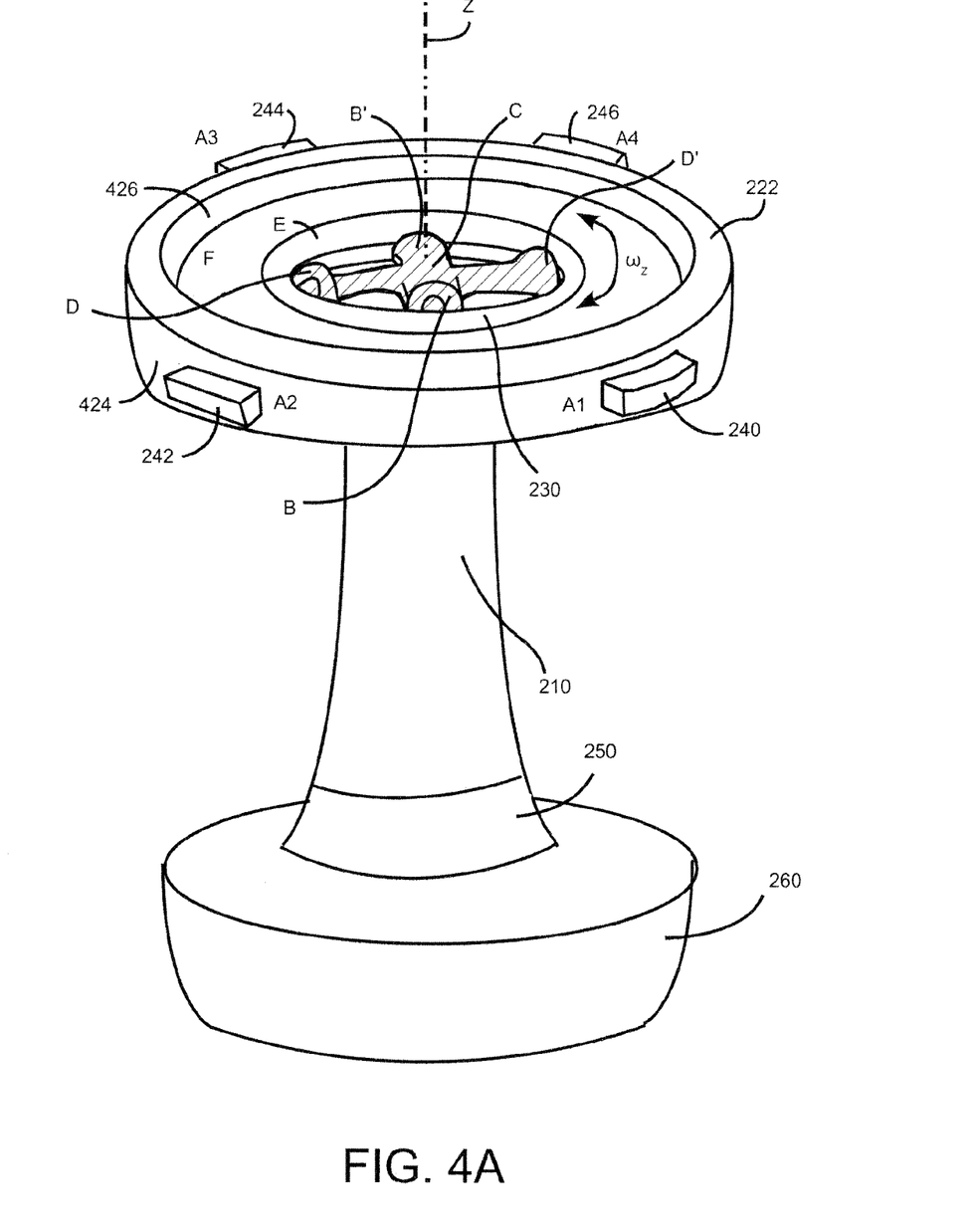
FIG. 4A is an illustration of a gravity gradiometer system according to an embodiment of the present invention.
Figure 4B:
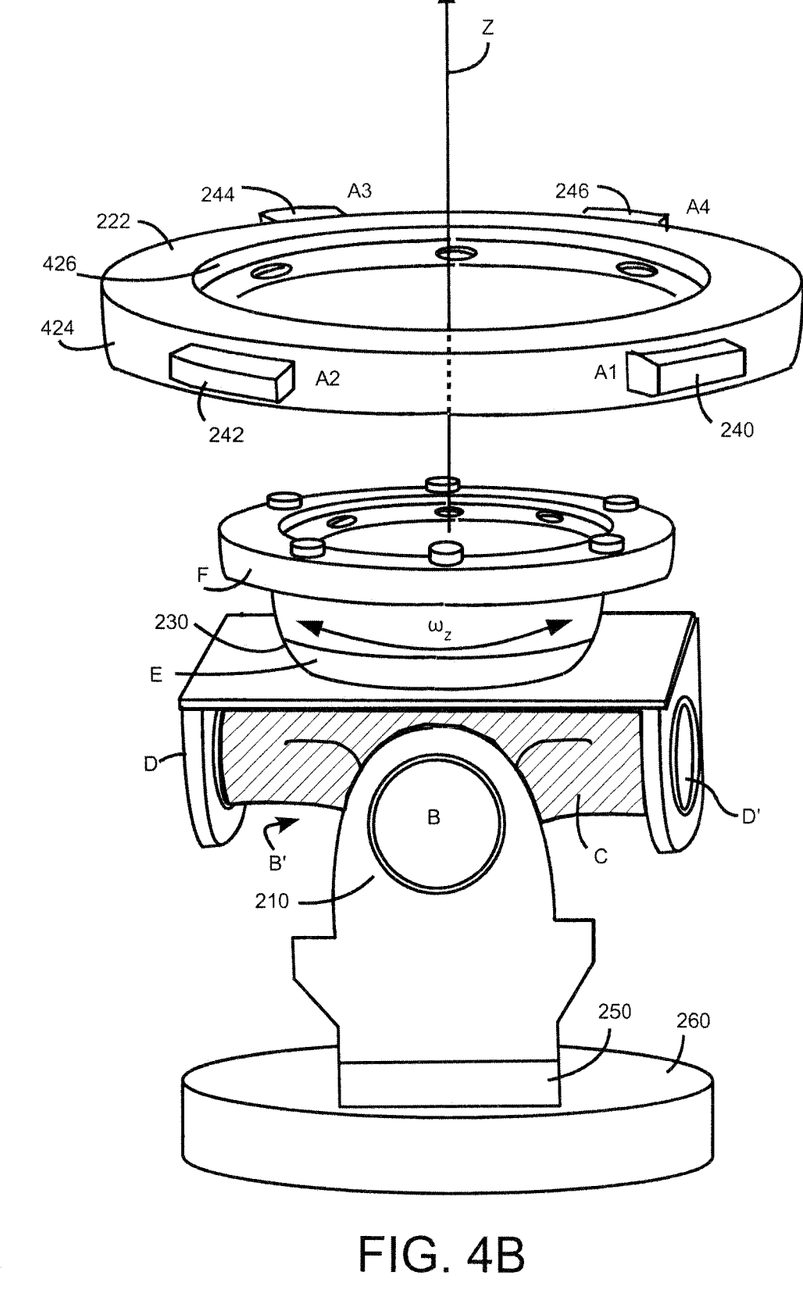
FIG. 4B is a more detailed illustration of the embodiment of FIG. 4A.

As illustrated in FIG. 3, a universal joint 210, in accordance with an embodiment of the present invention, has bearings at B and B' that allow relative rotation $\omega_x$ of element C with respect to the mounting section 250. Bearings at D and D' allow relative rotation $\omega_y$ of instrumentation platform E with respect to mounting section 250. The bearing plate (not shown in FIG. 3) is affixed, or may be integral to, the instrumentation platform E, such that bearing plate 230 permits rotation $\omega_z$ of the instrument package 220 with respect to central axis Z as shown in FIGS. 2-4. The coupling including universal joint 210 may be attached to a vehicle (e.g. a ship or plane) which serves a base 260 for supporting the GGI system.

The universal joint 210 may be of the type configured for coupling two movable members or shafts to allow multiple degrees of freedom of movement, as is well known in the art. Accordingly, a detailed description of such known components is omitted here for brevity.

Referring now to FIG. 4A in conjunction with the more detailed illustration depicted in FIG. 4B, there is shown an alternative embodiment of a gravity gradiometer system 400 in accordance with an embodiment of the present invention. In this embodiment the accelerometers, $A_1$ (240), $A_2$ (242), $A_3$ (244), $A_4$ (246) are affixed to an outer circumferential edge 424 of the instrument package 220 such that they are located perpendicular to the top surface 222 of the instrument package 220. The bearing plate 230 is rotationally coupled to an inner circumferential edge 426 of the instrument package 220 and further coupled to the universal joint 210.

In another configuration, the bearing plate 230 is configured to be integral with the instrument package 220 such that the universal joint 210 is operably coupled within the inner portion of the integrated bearing plate 230. In this configuration the instrument package 220 with the integrated bearing plate 230 is capable of rotation about the universal joint 210, thus providing a bearing having three degrees of rotational freedom.

In accordance with the embodiments depicted in FIGS. 2 and 4, the accelerometers $A_1, A_2, A_3, A_4$, are affixed at greater separation distances from one another relative to conventional systems having the same system footprint. Increased distance between accelerometers provides more accurate gradiometer performance without increasing the system footprint, and may enable the system to be more lightweight, thereby further stabilizing the gradiometer system. The inside-out configuration permits the rotational rate of the accelerometers to be controlled directly and sensed more accurately than conventional gradiometer systems.

The gradiometer system 400 according to an exemplary embodiment is configured to process the output signals of the accelerometers to provide second and/or third order gradient measurements. These measurements may be used for applications which depend on measurement of short wavelength gravity gradients. Exemplary gradiometers which are affixed to moveable objects, for example, an aircraft, provide greater accelerometer separation within the same or smaller footprint of gradiometer systems using an outside-in approach, in addition to facilitating stabilization of the gradiometer system, thereby providing more accurate gradiometer readings for the system.

Figure 5:
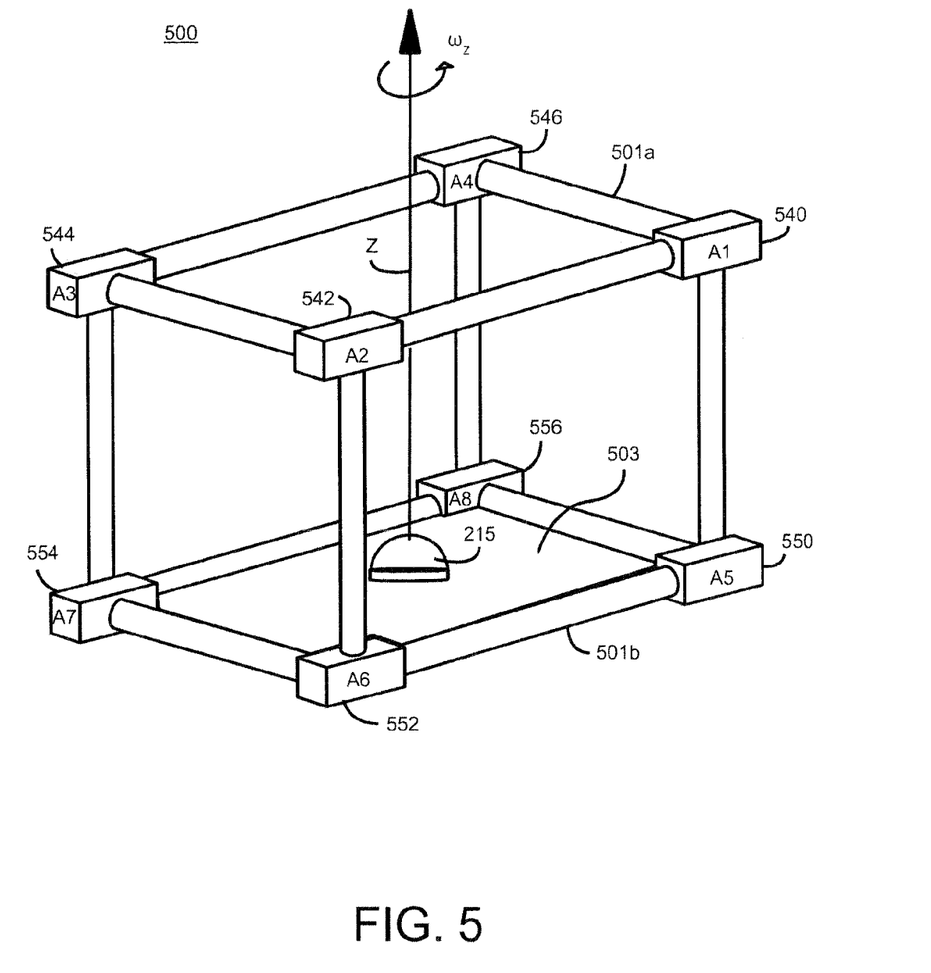
FIG. 5 is an illustrational of a 3-dimensional GGI and support structure according to an embodiment of the present invention.

Referring now to FIG. 5, another embodiment of a gravity gradiometer system 500 having accelerometers arranged in a non-coplanar configuration is shown. The gravity gradiometer system 500 shown in FIG. 5 comprises eight accelerometers A1-A8. The accelerometers form a matrix through connecting structure 501 which connects the accelerometers and maintains the relative position between accelerometers. For example, accelerometer A1 (540) is coupled to accelerometer A4 (546) through connecting structure 501a, and accelerometer A5 (550) is coupled to accelerometer A6 (552) through connecting structure 501b. The 3-dimensional GGI formed by accelerometers A1-A8, is supported by a support structure configured to isolate the GGI from external vibration from outside forces, such as vibrations transmitted from the base to which the GGI is mounted, and from the support structure itself. The support structure includes a coupler 215 which is configured to provide the GGI with three degrees of rotational freedom. For example, the GGI may be rotated along a spin axis Z, providing a first degree of rotational freedom. Coupler 215 provides rotation of the GGI about the Z axis which may be provided as an offset to rotational motion experienced by the GGI. The coupler 215 shown in FIG. 5, by way of a non-limiting example, is coplanar with a layer of accelerometers including accelerometer A5 (550), A6 (552), A7 (554) and A8 (556) which define plane 503. Plane 503 may be viewed as having two axes, a y-axis and an x-axis, which in combination with axis Z, provide the three degrees of rotational freedom provided by coupler 215. The x-axis and y-axis are orthogonal to each other and intersect at a point on plane 503 central to coupler 215. The GGI which includes the 3-dimensional configuration of accelerometers, extends beyond coupler 215. In this way, coupler 215 provides three degrees of rotational freedom, with the rotational axis being originated from a point in space substantially central to the volume defined by the GGI.

It is understood that the illustration of the exemplary embodiment of FIG. 5 is provided only by way of example. While FIG. 5. describes a GGI with accelerometers configured in a non-coplanar configuration forming a cubic matrix, this is not limiting and other geometric shapes may be used to provide a 3-dimensional configuration of accelerometers which would be within the scope of this specification. For example, another form of polyhedron (e.g. a tetrahedron) may be used.

GGIs are configured to sense small differences in the forces exerted by gravity. The accuracy of the gravity gradient measurements may be compromised by rotations of the GGI that are not known a priori. To manage these undesired rotational effects, most GGI's that are implemented on a moving base, for example, a GGI mounted within a plane or ship, are implemented using an inertially stabilized instrument platform. Mechanical gyroscopes may be used as rotational sensors to provide measurements to assist in stabilizing the platform, however, care must be used to vibrationally isolate these gyros from the GGI itself. In addition to the rotational effects contributed by the stabilization platform. However, the rotational motion of the GGI itself need to be determined and controlled. The use of optical gyroscopes is troublesome in that quantization effects may lead to jitter control performance that is insufficient for the precision needed in gradiometer applications. While optical gyroscopes with reduced quantization (i.e. a longer optical paths) may be used, their cost is prohibitive thus making their use practicable.

The GGI uses multiple accelerometers to measure the acceleration of an associated mass and determine the gravitational forces being exerted on the mass by its surroundings. As a result of the spatial separation or distance between accelerometers, the gravitational forces exerted by an outside mass exert a slightly different attractive force on each accelerometer's mass compared to another due to their respective proximity to the outside mass. In addition to the gravity gradients, the accelerometers in the GGI may be utilized to sense rotational acceleration of the GGI as well. For example, two accelerometers having common sensitive axes which are orthogonal to the vector separating the accelerometers will produce outputs having a difference between them. This difference is representative of the rotational acceleration about a third axis that is orthogonal to both the sensitive axes of the accelerometers and the separation vector between them. By differencing the outputs of the accelerometers, an error signal may be obtained that may be utilized in the design of a platform servo loop, provided to stabilize the platform. As this signal represents rotational acceleration, the DC component of the rotational rate is not observed. To control the low frequency aspects of the platform stabilization control, alternative implementations may be considered based on the application. By way of example, in a GGI system mounted to a non-moving base, platform stabilization is concerned with jitter effects. Due to the non-moving nature of the base, there are no DC rotational rates and the servo loop may be based solely on differential accelerometer measurements as described above. In another embodiment where the GGI and stabilization platform are mounted on a moving base, a sensor such as a conventional gyroscope may be used to provide low frequency rotational measurements for use in low frequency platform stabilization. The low frequency rotational measurements may be used as input in tandem with the differential measurements of the accelerometers to provide input to the servo stabilization loop. Since only low frequencies need to be provided by additional sensors (e.g. gyroscopes), there is greater flexibility in choosing the placement and quality of the additional sensors because the measure of rotational acceleration is obtained by summing the output of two or more accelerometers as described below. In practical terms the resulting system is more economical and more compact.

Vibrationally induced, high frequency rotational rates may be present and can be controlled with a servo system based on accelerometer summation of signals. Therefore, in one embodiment a servo loop of the GGI system is based on the measure of rotational acceleration obtained by summing the output of two or more accelerometers, without additional sensors, e.g. gyroscopes, for providing low frequency data. In an alternative example of a system implementing the low frequency aspects of platform control according to embodiments of the present invention, a conventional (e.g. low cost) gyroscope is implemented for low frequency control. In a system mounted on a moving base (e.g. a ship or plane), the low frequency rotational effects must be controlled or the measurements of the accelerometers will be corrupted. An optical gyro, for example, may serve as a sensor for providing this information. The use of accelerometer summations in combination with a gyroscope allows for the use of gyroscopes that do not have adequate high frequency performance for the purposes of gradiometry, but adequately serve the purpose of measuring DC rotational changes.

Systems designed in accordance with the described embodiments result in a stabilized GGI system providing equal or greater accelerometer spacing as compared to conventional systems while providing a smaller footprint at less weight.

Figure 6:
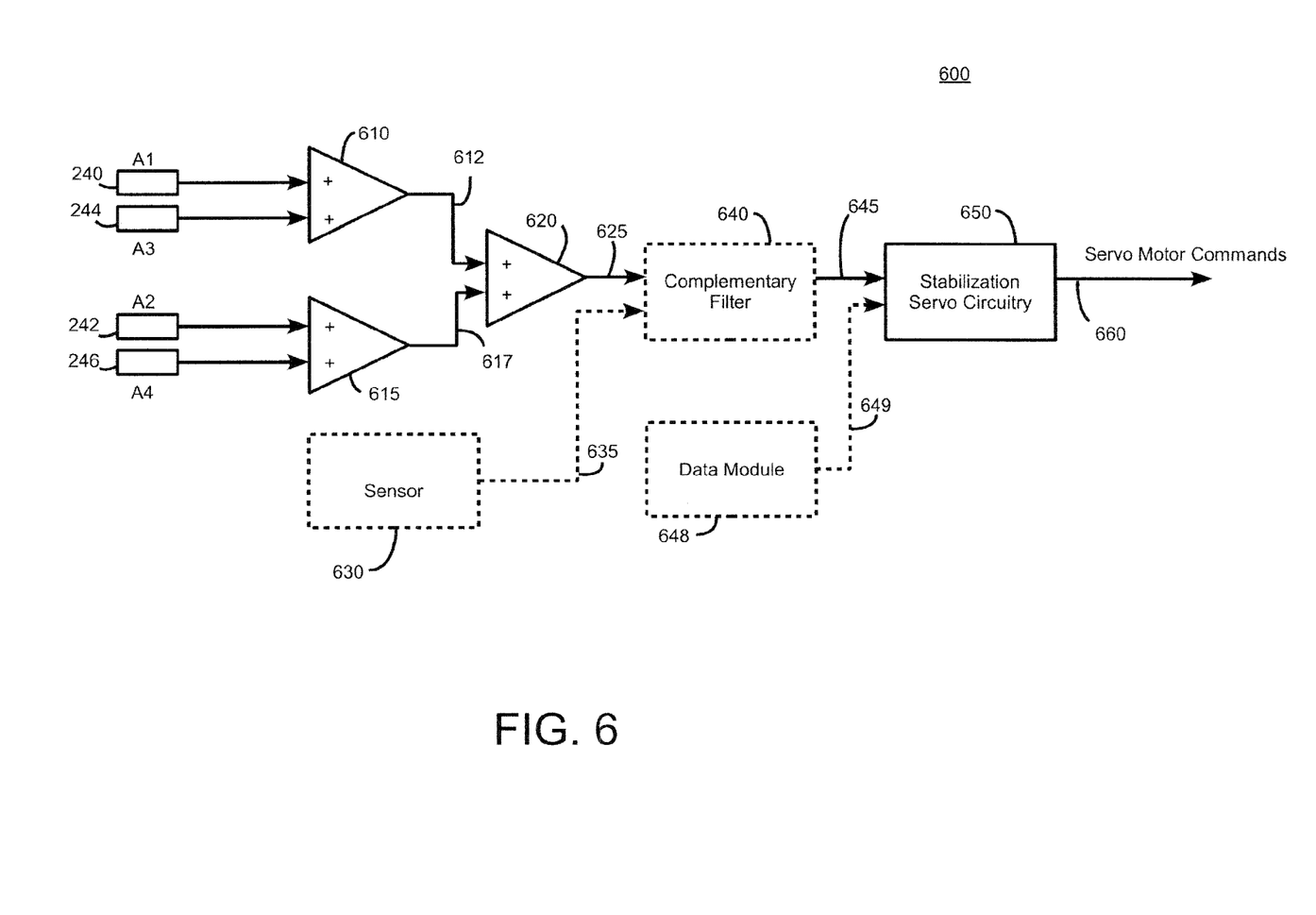
FIG. 6 is a process flow block diagram illustrating an embodiment of present invention for the processing of accelerometer signals in a gradiometer system.

Referring now to FIG. 6, there is shown an embodiment for obtaining from the accelerometer ($A_1$, $A_2$, $A_3$, $A_4$) output information in addition to the data indicative of gradient gravitational forces on a test mass useful for gravity gradiometer systems. The configuration of FIG. 6 processes accelerometer output data in a manner so as to provide an indication of rotational measurement errors. These errors may be used for implementation within a servo control system 600 for providing servo motor commands 660 and/or controls that increase platform stability. Increased platform stability provides enhanced stabilization of the GGI system and thereby more accurate gradient readings.

In GGI systems, Accelerometer outputs include data representative of a number of distinct components. The output of each of the accelerometers may include a gravitational acceleration component, representative of the gravitational forces exerted on a test mass associated with the accelerometer; a linear acceleration component, corresponding to linear motion of the gravity gradiometer system as a whole (i.e. linear acceleration common to all the accelerometers); and a rotational acceleration component that may result from platform vibration or jitter. The output measurements of a plurality of accelerometers in the system may be combined in a manner such that the gravitational acceleration and linear acceleration components are cancelled (i.e. the vector components of the gravitational acceleration and linear acceleration each total zero). The remaining measurement represents the rotational acceleration component which may be used as an error signal to a stabilization servo circuit that generates a servo command based in part on the rotational error signal. The servo command is used to control a servo which imparts a rotational bias on one of three degrees of rotational freedom defined by the coupling supporting the GGI of the gravity gradiometer system.

In FIG. 6, there is shown electronic circuit logic embodied in a computer processor operably coupled to a GGI system for extracting gradient data from the signals output by the accelerometers $A_1$, $A_2$, $A_3$, $A_4$ as shown by way of example only in FIG. 4, and providing servo control information 645 based on the accelerometer outputs. The accelerometers of instrument package 220 of FIG. 2, by way of a nonlimiting example, provide the signals of the acceleration vectors of $A_1$ 240, $A_2$ 242, $A_3$ 244, and $A_4$ 246 illustrated in FIG. 6. While the process of FIG. 6 is described for illustrative purposes from the perspective of a gravity gradient system such as those described in FIGS. 2 and 4, it should be understood that the process described with respect to FIG. 6 may be used in any gravity gradiometer system using accelerometers, including but not limited to, the system depicted in FIG. 1, or other systems, including those based on conventional gimbal support structures.

As shown in FIG. 6, and in conjunction with the embodiments of FIGS. 2 and 4, the output signals of accelerometers $A_1$ and $A_3$ are summed together via a summing circuit 610, with the output sum 612 being applied to a positive input terminal of a downstream summing circuit 620. The output signals of accelerometers $A_1$ and $A_3$ contain acceleration vectors representative of a gravitational acceleration component, a linear acceleration component and a rotational acceleration component. When the accelerometer output signals are summed in summing circuit 610, the gravitational acceleration and linear acceleration vectors from the accelerometer pair are added such that the gravitational and linear acceleration vectors cancel out leaving only a rotational acceleration signal component. The accelerometer signals $A_2$ and $A_4$ are summed together by a summing circuit 615 with the output sum 617 being applied to a second positive input terminal of the summing circuit 620. By summing the outputs 612, 617 obtained from the summed acceleration pairs, a reduction of noise is obtained, providing a more accurate output signal 625 representative of the rotational acceleration experienced by the gravity gradiometer system. The effect of the summation of signals of diametrically opposed accelerometers, as is accomplished by summing circuit 610, which sums diametrically opposed accelerometers $A_1$, and $A_3$, and summing circuit 615, which sums diametrically opposed accelerometers $A_2$, and $A_4$, is to cancel the component of acceleration due to a displacement in the instrument package 220 assembly in the XY plane.

By way of non-limiting example, the result of the sum of the summing circuit 620, is shown in the following formula:

$$(A_1+A_3)+(A_2+A_4)=4R\, d\omega_z/dt \qquad \text{Equation (1)}$$

Where the summation of the four accelerometer measurements is equal to the time derivative of the rotation rate (i.e. the angular acceleration) of the instrument block around the Z axis.

In an alternative embodiment, the accelerometers are summed according to the following formula: $(A_1+A_2)+(A_3+A_4)=4R\, d\omega_z/dt$. In either of the above embodiments, the vector sum of the accelerometers about one of the sensitive axis totals zero. While the embodiments described herein refer to summing circuits, it is understood that the circuit logic may be adapted in other configurations that operate to combine the accelerometer signals output from the GGI system in a manner that cancels the linear and gravitational acceleration components while providing an output representative of rotational acceleration of the GGI system.

In an embodiment of the gradiometer system of FIG. 6, optional additional gyroscopic sensors 630 (e.g. gyroscopic sensors) for sensing low frequency signal data (indicative of platform motion), are operably coupled to the input of a complementary filter 640. The sensors 630 output the sensed low frequency data (i.e. the gyroscope output 635) to the complementary filter 640. Complementary filter 640 may be further configured to receive output signal 625 output from summing circuit 620. This optional complementary filter 640 combines the accelerometer output sum data 625 of summing circuit 620 with gyroscope output 635 from sensor 630, to produce a signal 645 representing a measurement of rotational rate. Complementary filter 640 provides a simple, exemplary technique for mixing the two sets of rotational sensor data 625, 635. In this method, the relative benefits of each of the sensor data are characterized in the frequency domain. A relative weighting, for example varying from 1 to 0, is determined as a function of frequency. In the example that follows this weighting is notated with the frequency domain function $H(\omega)$. A time-domain filter may be implemented, which approximates this weighting. The filter function may be given by: filtered signal(t)=h(unfiltered signal(t)) wherein the complementary filtered combination of gyro measurements(t) and accelerometer summation(t) is given by:

h(accelerometer summation(t))+(gyro measurements(t)−h(gyro measurements(t))     Equation (2)

It is to be understood that without the gyros or other sensors 630 having adequate low frequency performance, a servo control loop based on the accelerometer summation would be unable to adequately control low frequency drift. Therefore, a servo control loop based on accelerometer summation alone (i.e. without the additional input from sensor 630) would be appropriate primarily for systems that are stationary, where the base holding the system is not itself rotating.

Referring again to FIG. 6, the rotational rate measurement signal 645 is then supplied/input to a downstream stabilization servo circuitry 650. Stabilization servo circuitry 650 operates to ensure that the orientation and rotational rates of the instrument package are appropriate for the acquisition of accurate measurement data. The stabilization servo circuitry 650 receives optional input of data parameters (including e.g. command and control data) 649 from data module 648. Stabilization servo circuitry 650 may include one or more of the following functional capabilities: the rotational rate measurement signal 645 may be compared to a lookup table or a predetermined program of pre-established measurements of rotational rates; or the rotational rate measurement signal 645 may be compared to a dynamic ideal configured by the system of, pre-established measurements of rotational rates. In such a dynamic ideal configuration, the command and control data may be compared to the rotational rate measurement signal 645. The command and control data 649 may include data of one or more of the following parameter data: target rotation, orientation, speed or velocity or a combination this data. Preferably stabilization servo circuitry 650 is a shaping filter that is fixed in time.

The stabilization servo circuitry 650 compares the rotational rate measurement signal 645 with the data parameter signal 649 to determine an offset or error signal which is the servo motor command signal 660 That is, the output of the comparison of the rotational rate measurement signal 645 with the data 649 from data module 648 compiled within stabilization servo circuitry 650 represents a measurement of the erroneous rotational rates configured to provide servo motor command signal 660. Servo motor commands are used to ensure that the orientation and rotational rates of the instrument package are appropriate for the acquisition of more accurate gradiometry measurements. Servo motor commands and/or controls that increase platform stability, provide enhanced stabilization of a gradiometry system which thereby provides more accurate gradiometry readings.

The method as illustrated in the above description and figures. may be applied to rotational displacement along any of the x axis ($\Delta x$), the y axis ($\Delta y$), or the z axis ($\Delta z$). That is, by way of example only, servos disposed within the support platform of the gravity gradiometer system (e.g. 200 shown in FIG. 2) may be responsive to the servo motor command signals output 660 from stabilization servo circuitry 650 to provide appropriate rotational offset along a respective axis.

While the foregoing describes exemplary embodiments and implementations, it will be apparent to those skilled in the art that various modifications and variations can be made to the present invention without departing from the spirit and scope of the invention.

What is claimed is:

1. A gravity gradiometer system comprising:
a gravity gradiometer instrument (GGI) comprising at least one accelerometer disposed on an instrument package;
a stabilization coupler having three rotational degrees of freedom, the stabilization coupler arranged centrally relative to said instrument package to provide rotation of said GGI along a spin axis orthogonal to a center of said stabilization coupler, said stabilization coupler comprising:
a bearing plate coupled on a first side to an interior portion of the instrument package and configured to provide one rotational degree of freedom through rotation of said GGI along a spin axis orthogonal to a center of said bearing plate; and
a universal joint coupled to a second side of said bearing plate, said universal joint having a first rotational axis orthogonal to said spin axis and a second rotational axis orthogonal to said spin axis and said first rotational axis and thereby providing two rotational degrees of freedom;
wherein said universal joint and said bearing plate are located substantially at a center of said instrument package.

2. The system of claim 1, wherein said stabilization coupler has a first rotational axis orthogonal to said spin axis and a second rotational axis orthogonal to said spin axis and said first rotational axis.

3. The system of claim 1, wherein said instrument package is o-shaped and wherein said bearing plate has a smaller lateral diameter than the o-shaped instrument package and is configured to be coupled to an interior portion of the o-shaped instrument package.

4. The system of claim 3, wherein said at least one accelerometer is disposed on an outer edge of an upper surface of said o-shaped instrument package.

5. The system of claim 4, wherein said at least one accelerometer includes a plurality of accelerometers arranged in pairs, each accelerometer in said pair spatially separated from the other at a given distance.

6. The system of claim 3, wherein said at least one accelerometer is disposed on a circumferential side of said o-shaped instrument package.

7. The system of claim 1, wherein said bearing plate is integrated with said instrument package.

8. The system of claim 3, wherein said bearing plate is coupled to said o-shaped instrument package at an inner circumferential edge of said o-shaped instrument package.

9. The system of claim 5, further comprising:
a servo associated with each rotational axis associated with the three rotational degrees of freedom of the stabilization coupler, each servo configured to provide rotational motion of said GGI along the associated rotational axis.

10. The system of claim 9, further comprising a processor for generating control signals for each servo, wherein upon receiving said control signals, the servo is operative to provide stabilization of the gravity gradiometer system by rotating the system along at least one of the rotational axes associated with the three rotational degrees of freedom of the stabilization coupler.

11. The system of claim 10, further comprising at least one sensor for detecting rotational movement and providing an output signal to said processor.

12. The system of claim 11, wherein said sensor comprises a gyroscope configured to detect low frequency rotational movement.

13. The system of claim 12, further comprising a processor for combining said output signal of said gyroscope with outputs from said plurality of accelerometers.

14. A method of stabilizing a gravity gradiometer instrument (GGI) comprising:
disposing accelerometers on an instrument package, said accelerometers configured for providing accelerometer data indicative of gradient gravitational forces on a test mass;
coupling said instrument package to a first side of a bearing plate configured to provide one rotational degree of freedom through rotation of said GGI along a spin axis orthogonal to a center of said bearing plate, wherein said coupling locates the bearing plate substantially at a center of the instrument package;
coupling a universal joint to a second side of said bearing plate, said universal joint having a first rotational axis orthogonal to said spin axis and a second rotational axis orthogonal to said spin axis and said first rotational axis and thereby providing two rotational degrees of freedom, wherein said coupling locates the universal joint substantially at a center of said instrument package;
receiving, via said accelerometers, accelerometer data indicative of components of linear, gravitational, and rotational acceleration;
combining said accelerometer data in a manner so as to cancel the linear and gravitational components to generate a signal indicative of rotational motion from said accelerometers;
comparing said signal indicative of rotational motion with threshold data; and generating a servo command based on said comparison and indicative of an offset to said rotational acceleration components from said accelerometers.

15. The method of claim 14, wherein said accelerometers are arranged in pairs on a support structure of said system, each pair having a common sensitive axis perpendicular to a vector between each accelerometer in said pair; and wherein said combining comprises summing a rotational acceleration measurement output from each accelerometer in each said pair.

16. The method of claim 15, further comprising:
receiving a low frequency rotational motion measurement from a sensor coupled to said support structure;
combining the low frequency rotational measurement and the summed rotational acceleration measurement in a complementary filter to produce a combined rotational rate measurement signal;
providing the rotational rate measurement signal to a stabilization servo circuit.

17. The method of claim 16, further comprising:
receiving parameters at said stabilization servo circuit from a data module, wherein said parameters provide command and control data to said stabilization servo circuit.

18. The method of claim 17, wherein said command and control data comprises at least one of: target rotation, orientation and speed, relative to said GGI and a base to which the GGI is mounted.

19. The method of claim 16, wherein said stabilization servo circuit is a shaping filter that is fixed in time.

* * * * *